United States Patent [19]
Friedrich et al.

[11] Patent Number: 5,934,712
[45] Date of Patent: Aug. 10, 1999

[54] DOUBLE CONTAINMENT PIPE MECHANICAL JOINTS

[75] Inventors: Ralph S. Friedrich, Hermosa Beach, Fla.; Paul Kubat, La Mirada, Calif.

[73] Assignee: Ameron International Corporation, Pasadena, Calif.

[21] Appl. No.: 08/800,318

[22] Filed: Feb. 14, 1997

[51] Int. Cl.⁶ .............................. F16L 37/50; F16L 47/04; F16L 17/067
[52] U.S. Cl. .................... 285/123.15; 285/179; 285/342; 285/354
[58] Field of Search ........................... 285/123.1, 123.15, 285/322, 323, 343, 341, 342, 113, FOR 113, FOR 120, FOR 121, 354, 179; 403/369, 370

[56] References Cited

U.S. PATENT DOCUMENTS

| | | | |
|---|---|---|---|
| 2,951,715 | 9/1960 | Bauer | 285/341 X |
| 3,103,737 | 9/1963 | Lennon et al. | 285/342 |
| 3,284,114 | 11/1966 | McCord, Jr. et al. | 403/370 |
| 3,372,715 | 3/1968 | Ashton | 141/59 |
| 3,498,647 | 3/1970 | Schroder | 285/343 |
| 3,603,912 | 9/1971 | Kelly | 285/341 X |
| 5,547,231 | 8/1996 | Sharp | 285/123.15 |

FOREIGN PATENT DOCUMENTS 96-09487  3/1996  WIPO .

Primary Examiner—Anthony Knight
Assistant Examiner—Gary Grafel
Attorney, Agent, or Firm—Christie, Parker & Hale, LLP

[57] ABSTRACT

A double containment coupling is used to form a mechanical joint between double containment pipes. The coupling has an inner primary member within an outer secondary member. Two seals, one on top of the other, are fitted on top of the primary pipe which extends beyond the secondary pipe of the double containment pipe. The coupling inner member is fitted over the primary pipe and seals. An inner locking nut is threaded on the coupling inner member outer surface pushing a thrust ring onto one of the seals, sliding the seal over the other seal compressing and energizing both seals so as to create a seal between the primary pipe and the coupling inner member. A first end of a closure member is threaded onto the outer surface of the coupling outer member. An outer locking nut threaded on a second end of the closure member compresses a seal between the closure member and the secondary pipe creating a seal between the closure member and the secondary pipe outer surface.

37 Claims, 4 Drawing Sheets

DOUBLE CONTAINMENT PIPE MECHANICAL JOINTS

BACKGROUND OF THE INVENTION

This invention relates to mechanical joints for double containment pipes and fittings and to methods for making such joints.

Double containment pipes are in common use for transporting contaminants and toxins underground. They are most commonly used as underground gasoline transporting pipelines. A double containment pipe is in essence a pipe within a pipe. An annulus is formed between the pipes. An inner, or primary, pipe is the carrier of the fluids while the outer, or secondary, pipe is used to contain any leakage from the primary pipe. Most commonly, these pipes are made from rigid fiberglass.

In order to connect the corresponding primary and secondary pipes of consecutive double containment pipes, it is required that the pipes be shaved prior to bonding. Moreover, it is very difficult to bond joints in cold wet climates. Consequently, the costs for bonding double containment pipes are excessive, and the quality of the joints is not consistent. As a result, there has been a noticeable decline in the use of fiberglass double containment pipes. Instead, flexible hoses requiring no bonding have taken a significant market share, even though they are more expensive than fiberglass double containment pipes. The reason for the emergence of these flexible hoses is that they can be easily connected together in cold, wet weather.

Accordingly, there is a need for a mechanical joint for joining double containment pipes that can be easily applied under cold, wet climates.

SUMMARY OF THE INVENTION

A coupling which can be either linear, or an elbow, T or Y fitting, is used for the purpose of coupling consecutive double containment pipes. Double containment pipes have a primary pipe fitted within a secondary pipe forming an annulus therebetween. The coupling has a primary inner member fitted within a secondary outer member. An annulus is formed between the members. The primary pipe to be connected extends beyond the secondary pipe.

In the preferred embodiment, a pair of tapered elastomeric inner seals are positioned within the coupling inner member near the member open end. The first seal has a tapered inner surface and an outer surface diameter smaller than the inner surface diameter of the inner member. The second seal has an inner surface diameter greater than the outer surface diameter of the primary pipe. The outer surface of the second seal is tapered and is matched to the tapered surface of the first seal. The second seal is fitted within the first seal. The second seal outer tapered surface tapers to a smaller diameter toward the coupling inner member end.

The extended primary pipe is slid into the end of the coupling inner member until it hits a stop located on the inner surface of the inner member. An annular inner locking nut is then threaded onto the outer surface of the inner member and pushes a thrust ring which forces the first inner seal over the second inner seal compressing the seals between the primary pipe and the coupling inner member creating a tight seal therebetween. The compression friction locks the second inner seal to the primary pipe and the first inner seal to the inner member. Consequently, when under pressure, the tapered seals further wedge against each other forming a tighter seal.

A first end of a closure member which is preferably made from a thermoplastic material, is threaded to the outer member of the coupling sandwiching an O-ring seal therebetween for forming a seal. An annular outer locking nut fitted over the secondary pipe is threaded onto a second end of the closure member compressing another O-ring seal between the secondary pipe and the end of the closure member forming a seal between the secondary pipe and the closure member.

In an alternate embodiment an annular elastomeric seal is slid over the extended primary pipe. With this embodiment, as the inner locking nut is threaded to the coupling inner member, it compresses and energizes the seal against the primary pipe and the coupling inner member, creating a seal.

The first end of a closure member, which is preferably a rubber boot, is clamped over the secondary pipe, preferably with a worm gear clamp. The closure member second end is clamped over the inner locking nut. Bleed holes are drilled along the length of the inner locking nut to allow fluids accumulated in the annulus of the double containment pipe to communicate with the annulus of the double containment coupling.

The coupling outer member encompasses a portion of an inner locking nut. To seal and lock the coupling outer member to the inner locking nut, an O-ring seal is fitted in a groove on the inner locking nut outer surface and is sandwiched between the inner locking nut and the coupling outer member.

In yet a further alternate embodiment, the closure member second end is coupled to coupling outer member. With this embodiment, the coupling outer member is fitted over an annular portion of the inner locking nut. The closure member second end is then slid over the coupling outer member. The closure member second is then clamped, preferably using a worm gear clamp, locking the closure member to the coupling outer member. An annular gap is created between the locking nut and the coupling outer member.

In a further embodiment the coupling inner member is slid over and bonded directly to the primary pipe. A rubber boot is then bonded or mechanically fastened at one end to the outer surface of the coupling outer member and at the other end to the secondary pipe outer surface.

DETAILED DESCRIPTION

Figure 1:
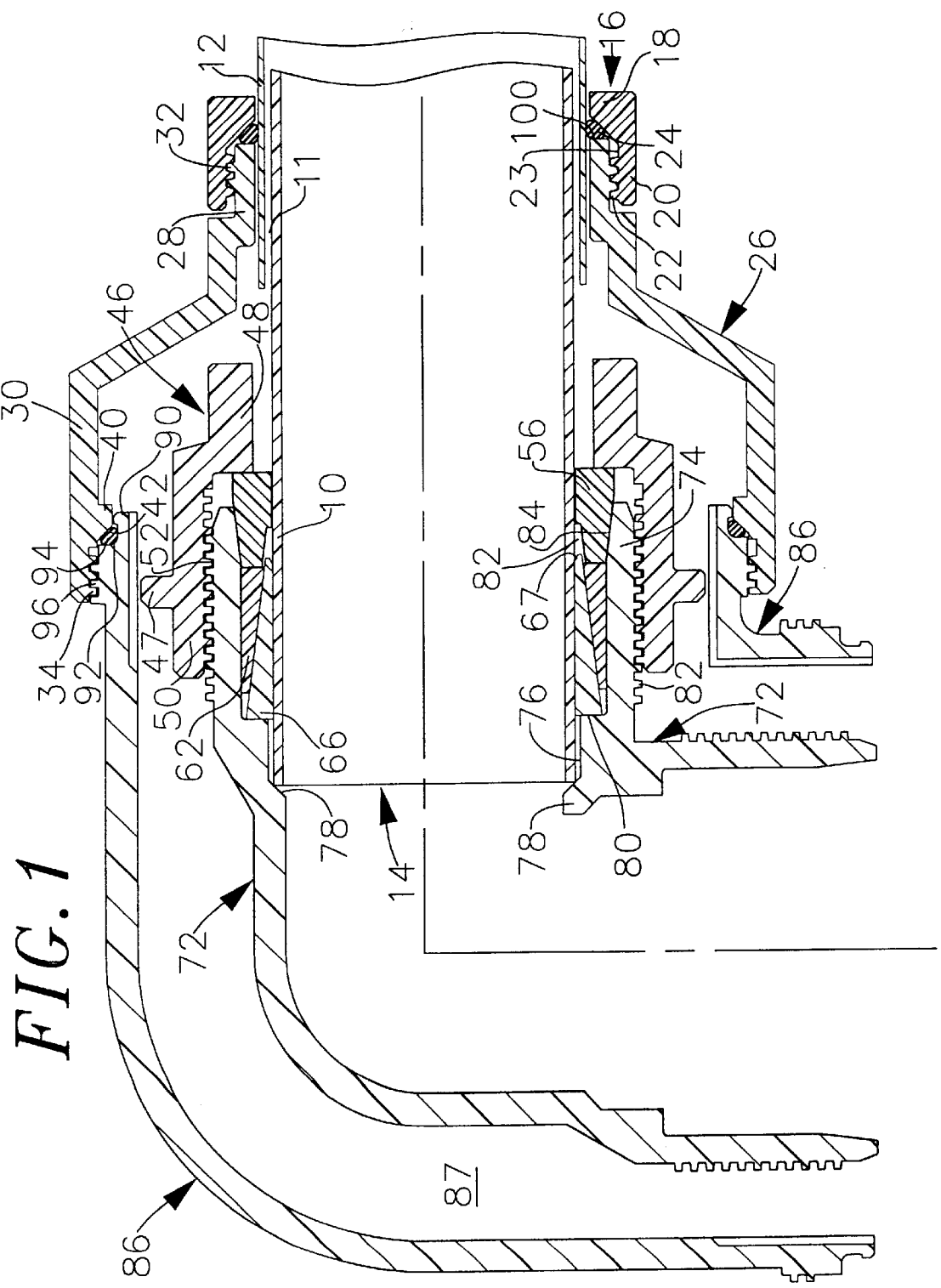
FIG. 1 is a cross sectional view of the preferred embodiment of a mechanical joint for joining double containment pipes.

A double containment pipeline section has a primary pipeline section 10 within a secondary pipeline section 12 (FIG. 1). An annulus 11 is formed between the two sections. These sections can be either fittings or pipes. A mechanical double containment coupling or fitting is used to couple double containment pipeline sections. The coupling can be linear or it can be an angled or branched fitting. For illustrative purposes, the invention is described herein in reference to an elbow fitting coupling (FIG. 1). Moreover, for illustrative purposes, the double containment pipeline sections referred to herein will be double containment pipes. The double containment coupling also has an inner or primary member 72 within an outer or secondary member 86.

The coupling typically has two ends for connecting to each of the double containment pipes to be coupled together. Only one end of the coupling, as well as the accessories for joining that end to a double containment pipe are described herein since both ends, and their corresponding accessories, are identical with the exception that they may be of different size as in the case where a larger diameter double containment pipe is connected to a smaller diameter double containment pipe.

Figure 2:
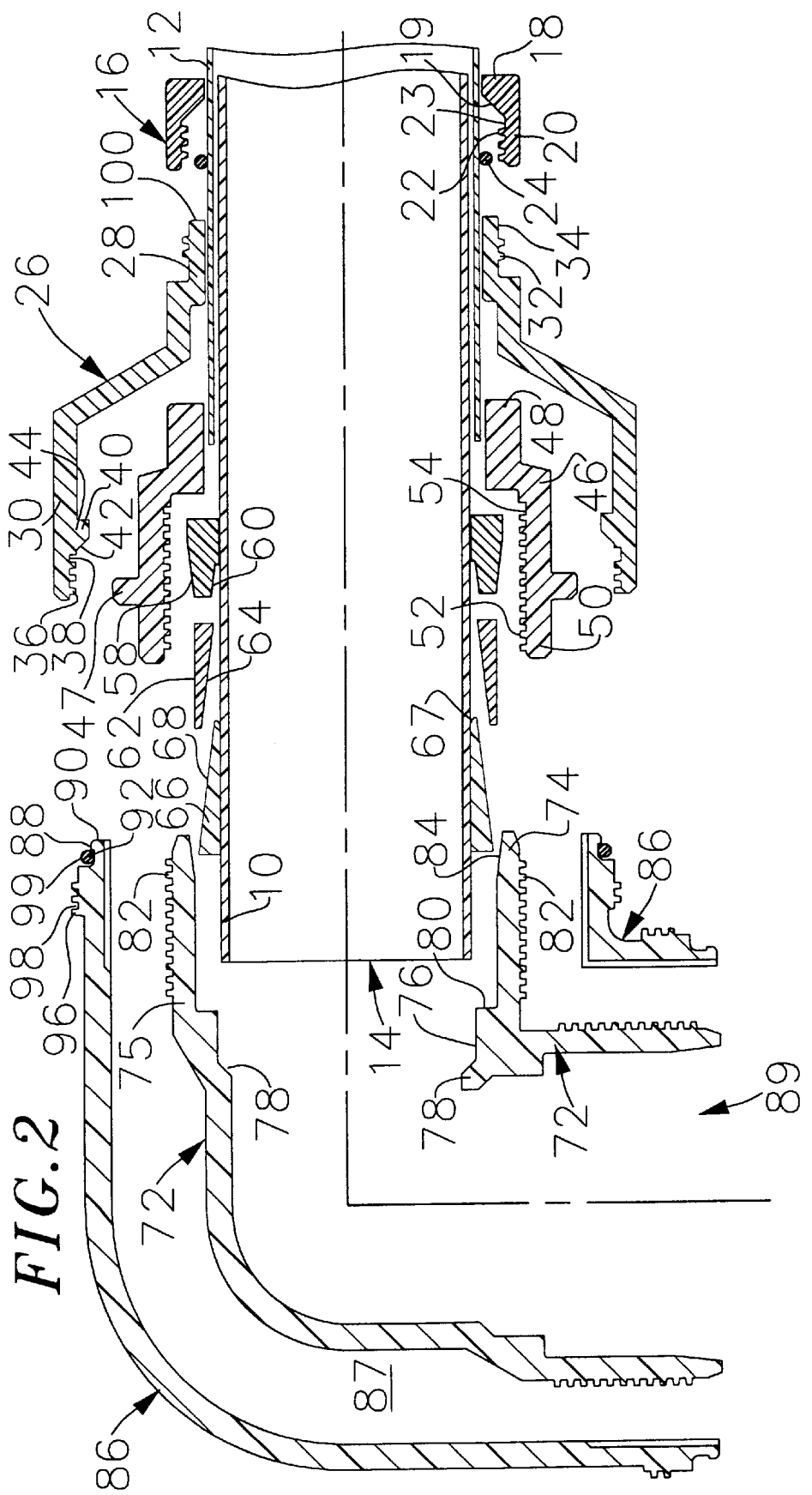
FIG. 2 is an exploded view of the embodiment shown in FIG. 1.

In the preferred embodiment the coupling and the accessories for mechanically connecting the coupling to the double containment pipe come preassembled. Referring to the exploded view of FIG. 2 for ease of disclosure, the primary pipe 10 extends beyond the secondary pipe 12 at the end 14 of the double containment pipe to be connected to the coupling. The accessories include an annular outer locking nut 16. The outer locking nut has two sections. The first section 18 has an inner diameter that is slightly larger than the outer diameter of the secondary pipe. The first section tapers into a second section 20 forming a tapered face 19. The second section has an inner diameter larger than the inner diameter of the first section. Threads 22 are formed on the inner surface 23 of the second section.

A first O-ring outer seal 24 is compressed between the tapered face 19 of the outer locking nut, an annular closure member 26 and the outer surface of the secondary pipe. When uncompressed the first O-ring has an inner diameter slightly larger than the outer diameter of the secondary pipe so that it can also be easily fitted over the secondary pipe.

The annular closure member 26 is bell shaped in that it has a smaller diameter portion 28 which is stepped into a larger diameter portion 30. The closure member is preferably made from a thermoplastic material. The smaller diameter portion has an inner diameter that is slightly larger then the outer diameter of the secondary pipe. Threads 32 are formed on the outer surface 34 of the smaller diameter portion. These threads are complementary to the threads 22 on the inner surface of the second portion of the outer locking nut. The larger diameter portion has threads 36 formed on its inner surface 38 near its open end. An annular lip 40 is formed on the inner surface of the larger diameter portion next to the threads 36. The annular lip has a tapered surface 42 facing the threads 36 whereby the lip is widest at its base 44.

The end section 74 of the coupling inner member forms a bell section 75 in that its diameter is stepped up forming a larger diameter opening. The inner surface portion 84 at the opening end of the bell section is tapered increasing in diameter toward the opening. The inner surface of the bell section is stepped down to a narrower diameter section 76, away from the opening, which is slightly larger than the outer diameter of the primary pipe. This step forms a vertical wall 80. Stops 78 are formed on the inner surface of the coupling inner member at a distance approximately half an inch away from the vertical wall 80. In this regard, the primary pipe can be slid within the coupling inner member bell section until the pipe hits the stops 78. Threads 82 are formed on the outer surface of the bell section.

A first annular inner elastomeric seal 62 having a wedge-shaped cross-section with a tapered inner surface 64 is located within the bell section. The inner surface of the seal tapers such that it has a smaller inner diameter closer to bell section opening and a larger inner diameter further from the opening. The outer diameter of the first annular seal is slightly smaller than the diameter of the untapered inner surface of the bell section. A second annular inner elastomeric seal 66 which also has a wedge-shaped cross-section with a tapered outer surface 68 is mated to the first inner seal. The second inner seal rests with its thicker section against the wall 80 formed on the inner surface of the bell section. The tapered surfaces of the two inner seals are complementary to each other. In this regard, the second seal can be fitted within the first seal. The inner (non-tapered) surface diameter of the second inner seal is slightly larger than the outer diameter of the primary pipe so as to allow the primary pipe to slide within it. The second inner seal is preferably wider than the first inner seal. The two inner seals and the inner surface 84 of the bell section are tapered at the same angle.

A split annular thrust ring 56 contacts the thicker end of the first inner elastomeric seal. The thrust ring inner diameter is larger than the outer diameter of the primary pipe. A portion 58 of the outer surface of the thrust ring is tapered narrowing in thickness in a direction toward the first inner seal. A portion 60 of the bottom surface of the thrust ring at the end nearest the first inner seal is also tapered at the same angle as the taper on the second inner elastomeric seal. The thrust ring is preferably made from a thermoplastic material.

An annular inner locking nut 46 has a first portion 48 which is stepped into a second portion 50. The inner diameter of the first portion is slightly larger than the outer diameter of the primary pipe. However, it is preferred that the inner diameter of the first portion is also slightly larger than the outer diameter of the secondary pipe so as to allow the inner locking nut to slide over the secondary pipe, if necessary. The second portion of the inner locking nut has an inner diameter which is larger than the inner diameter of the first portion. Threads 52 are formed on the inner surface 54 of the second portion. These threads are complementary to the threads 82 on the outer surface of the bell section. The inner locking nut is threaded onto the bell section. An annular lip 47 is formed on the outer surface of the second portion 50 of the inner locking nut. The inner locking nut is also preferably made from a thermoplastic material.

The inner diameter of the second portion 50 of the inner locking nut is larger than the diameter of the untapered outer surface of the thrust ring. The inner diameter of the first portion 48 of the inner locking nut, however, is smaller than the diameter of untapered outer surface of the thrust ring.

The coupling outer member 86 is slid over the coupling inner member. The diameter of the inner surface of the coupling outer member is larger than the outer diameter of the coupling inner member so as to form an annulus 87 between the two members. The inner locking nut annular lip 47 also serves as a guide for spacing the coupling inner member from the coupling outer member and thus creating the annulus 87. This lip reduces the radial clearance between the coupling outer member inner surface and the inner locking nut so that it can be bridged with soapy water for testing for leakage.

The outer surface, near an end 90, of the coupling outer member is stepped down to a decreased diameter surface 88. An annular groove 92 is formed on the decreased diameter surface 88. A second O-ring seal 99 is fitted within that groove. Outer threads 96 complementary to the threads on the inner surface of the closure member are formed on the outer surface 98 next to the groove 92 on the coupling outer member. The closure member is threaded onto these threads.

As discussed earlier, the coupling comes preassembled with its inner and outer member and required accessories. To form the joint, the outer locking nut is backed off, allowing the O-ring seal to ride up and expand on the tapered face of the outer locking nut, freeing the O-ring. It is preferred that the outer locking nut is not completely backed off. In this regard, the outer locking nut remains assembled on the closure member. The closure member 26 is then unscrewed from the coupling outer member 86 and is also slid over the secondary pipe. The primary pipe end to be coupled extends beyond the corresponding end of the secondary pipe. The extended primary pipe end is slid into bell section of the inner member of the coupling until it hits the stops 78. A tapered lead 67 on the second inner seal serves to guide the pipe within and past the second inner seal. Once the inner pipe rests against the stops 78, the inner locking nut is further threaded on the bell section.

When the primary pipe is pushed into the coupling inner member and rests against the stop 78, the second inner elastomeric seal does not make complete sealing contact with the outer surface of the primary pipe since the diameter of the inner surface of second elastomeric seal is larger than the diameter of the outer surface of the primary pipe. Similarly, the outer surface of the first inner elastomeric seal does not make contact with the inner surface of the bell section of the coupling inner member since the outer surface diameter of the first inner elastomeric seal is smaller than the inner diameter of the bell section.

As the inner coupling nut is further threaded on the inner member of the coupling, it pushes on the split thrust ring which in turn pushes on the first inner seal forcing it over the second inner seal causing the first inner seal to make full contact with the inner coupling member bell section inner surface and the second inner seal to make full contact with the primary pipe outer surface. The tapered inner surface 60 of the thrust ring is designed to allow the thrust ring to travel and push the first inner elastomeric seal over the second inner elastomeric seal by allowing the tapered surface 60 to ride over a portion of the second elastomeric seal tapered surface. The wall 80 on the inner surface of the bell section prevents the second inner seal from moving in the direction of the thrust provided by the thrust ring.

Further threading causes the two inner seals to energize by being compressed against each other and against the inner coupling member and the primary pipe. By being energized and compressed the two elastomeric seals exert radial forces against each other and against the primary pipe and the inner coupling member bell section, locking the primary pipe onto the inner coupling member. A locking friction is created between the second elastomeric inner seal 66 and the primary pipe outer surface as well as between the first elastomeric inner seal and the coupling inner member. The torque on the inner coupling nut required to create the seal is very low.

The locking seal formed between the primary pipe and the coupling inner member is self actuating in that if the primary pipe tries to disengage from the coupling inner member due to pressure, the tapered second inner seal which is friction locked on the primary pipe will further wedge against the tapered first inner seal forming a tighter seal and thus, prevent the disengagement of the primary pipe from the coupling inner member. The seal between the coupling inner member and the primary pipe can withstand pressures of 500 psi.

It is important that the radial clearance between the inner surface of the thrust ring and the outer surface of the primary pipe is kept small so as to prevent the extrusion therethrough of the second inner seal as the thrust ring pushes the first inner seal over the second inner seal. Primary as well as secondary pipes experience diametral differences due to manufacturing tolerances. To prevent extrusion of the seal, this minimum radial clearance must be unaffected by diametral differences. With the present joint design this clearance is unaffected by diametral differences.

As the inner locking nut is threaded onto the bell section of the coupling inner member, it causes the thrust ring tapered outer surface 58 to ride against the tapered inner surface 84 of the bell section. If the primary pipe has a smaller outer diameter, the radial clearance between the thrust ring inner untapered surface and the primary pipe outer surface would be larger than if the primary pipe had a larger outer diameter. Similarly, a larger radial clearance would exist between the second inner seal and the primary pipe. In order to energize the seals, the thrust ring would have to travel further into the bell section of the coupling inner member so as to further push the first inner seal over the second inner seal. As the thrust ring rides on the tapered surface 84 its forced to contract reducing the clearance between the primary pipe outer surface and the thrust ring inner surface. Since the bell section tapered surface 58 is tapered at the same angle as the bell section tapered surface 84 and the tapered surfaces 64 and 68 of the first and second inner elastomeric seals, the rate of contraction of the thrust ring will be identical to the rate of contraction of the second inner seal on the primary pipe. Similarly, if a primary pipe with a larger diameter due to diametral differences is used, the radial clearance between the inner surface of the thrust ring and the outer surface of the primary pipe will be relatively smaller. As such, the thrust ring will not have to travel as far into the bell section in order to energize the two seals, thus, only minimally reducing the radial clearance between the thrust ring and the primary pipe. Consequently, regardless of the diametral differences of the primary pipes, a constant radial clearance between the thrust ring inner surface and the primary pipe outer surface is always maintained without having to change the size of the thrust ring.

In cases where the coupling's other end is already joined to a double containment pipe, the coupling primary member may be checked for leaks by bridging the gap between the inner locking nut lip 47 and the coupling outer member 86 using soapy water and pressurizing the inner coupling member preferably using air. If a leak exists in the inner coupling member, bubbles would appear on the soapy water bridging the gap. Soapy water as used herein also includes liquid soap and the like.

Similarly, to check leakage of the primary pipe, soapy water may be used to bridge the annulus 11 between the primary pipe and the end of the secondary pipe. The primary pipe is then pressurized preferably using air and the soapy water is checked for bubbles. Bubbles are indicative of leaks in the primary pipe.

Once the coupling inner member and primary pipe are checked for leaks and are determined to be leak free, the closure member is threaded on the coupling outer member. As the closure member is threaded onto the coupling outer member, the annular lip tapered surface 42 of the closure member makes contact and compresses the second O-ring seal 99, forming a seal at the joint between the coupling outer member and the closure member.

The outer locking nut is then threaded on the closure member other end such that the outer locking nut tapered surface 19 compresses the O-ring seal 24 between the end of the closure member and a secondary pipe outer surface creating a seal. This sealing arrangement accommodates diametral differences between secondary pipes. For example, if a secondary pipe has a smaller outer surface diameter, the outer locking nut 16 will have to be further threaded against the closure member so as to further compress the O-ring seal 24. In cases where the outer diameter of the secondary pipe is relatively larger, the outer locking nut 16 will not have to be threaded as much over the closure member in order to similarly compress the O-ring seal and thereby create the same seal.

The pipes and coupling can be frequently tested for leaks of the primary pipe as well as the coupling inner member by backing off the outer locking nut, the O-ring seal 24 and the closure member over the secondary pipe so as to expose the end of the annulus 11 between the primary pipe and the secondary pipe as well as the space between the inner locking nut annular lip 47 and the coupling outer member which is in communication with the annulus 87 defined between the coupling inner and outer members. The primary pipe and the coupling inner member may then be tested for leaks using soapy water as discussed above.

Once the closure member is installed, the seals formed between the closure member and the coupling outer member as well as between the outer locking nut and the secondary pipe may be checked by applying soapy water on the interface between the closure member and the coupling outer member, and between the secondary pipe and the outer locking nut. The annulus between the primary and secondary pipes is then pressurized using air and the soapy water is checked for bubbles.

As will become apparent to one skilled in the art, the inner locking nut and the thrust ring could be a single piece. However, use of such a single piece would be susceptible to higher friction. The friction would increase because the locking nut will have to rotate while it is pushing forward against the first elastomeric inner seal, as well as while it is being sandwiched and compressed between the coupling inner member and the primary pipe. Consequently more force would be required to thread the locking nut onto the coupling inner member. Moreover, one skilled in the art would understand that this invention may be practiced with the two inner seals flipped over 180° such that the thrust ring pushes on the second seal rather than the first. However, in this regard the seals would not be self locking.

If a second containment pipe is to be connected to the other end 89 of the coupling, the same procedure as described above is followed.

Figure 3:
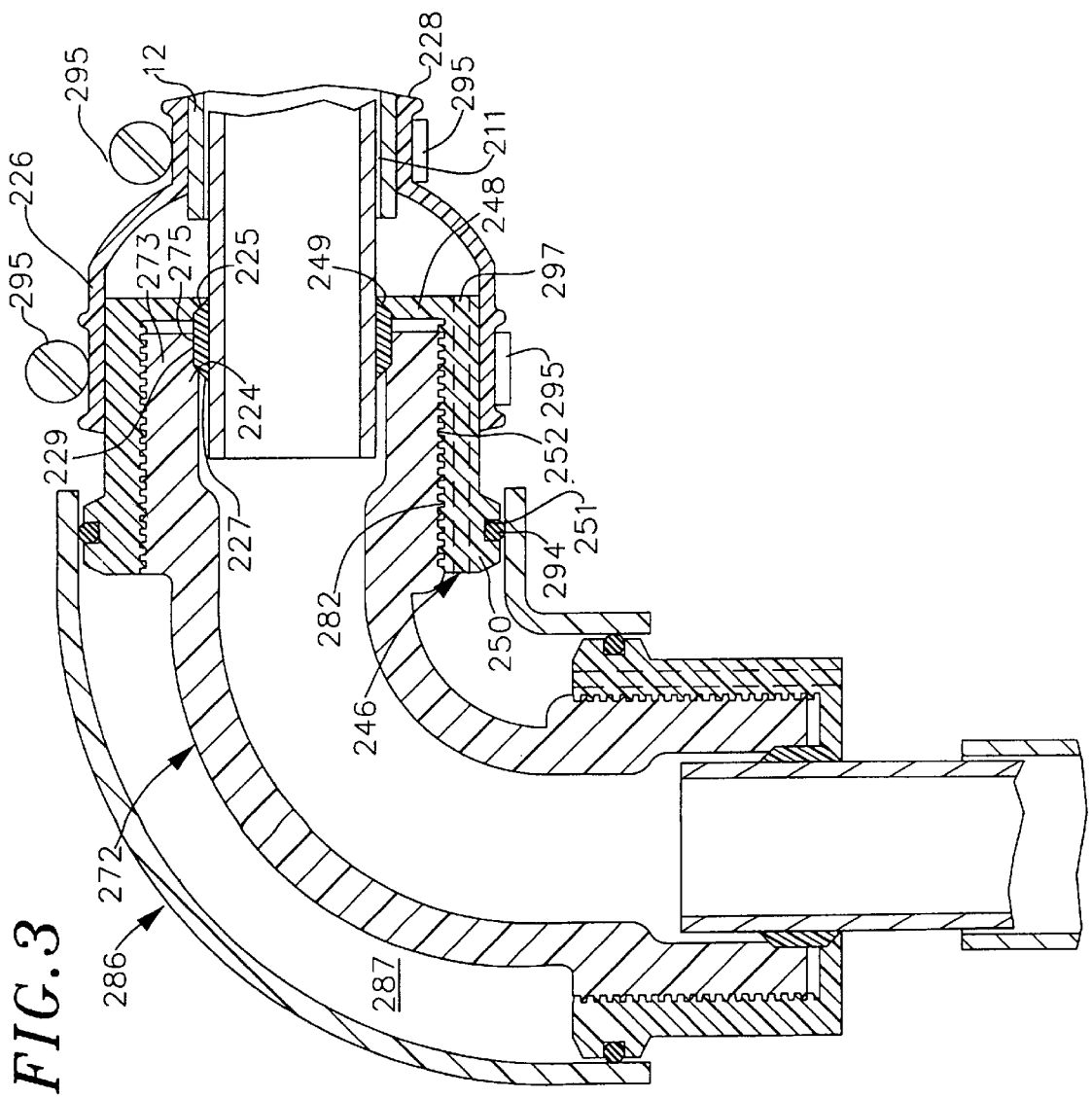
FIG. 3 is a cross sectional view of an alternate embodiment of a mechanical joint for joining double containment pipes.

In a second embodiment (FIG. 3), a closure member 226, preferably a rubber boot, is fitted with its smaller diameter portion 228 over the secondary pipe 12. The smaller diameter portion of the rubber boot has preferably an inner diameter slightly larger then the outer diameter of the secondary pipe.

The coupling outer member 286, which is preferably a one piece fiberglass jacket, is fitted over the coupling inner member. A locking nut 246 having a stepped inner surface creating two sections, is slid over the primary pipe. The first section 248 of the locking nut has an inner surface whose diameter is slightly larger than the diameter of the primary pipe outer surface. A portion of the first section forms a tapered surface 249. The second section 250 of the locking nut has an inner diameter which is larger then the inner diameter of the first section of the locking nut. Threads 252 are formed on the inner surface of the second section which are complementary to the threads 282 on the outer surface of the coupling inner member. A groove 251 is formed on the outer surface of the second section proximate the end of the locking nut. An O-ring seal 294 is fitted within that groove.

An annular seal 224 having a truncated pyramided cross-section having two tapered ends is then fitted over the primary pipe 10. The first tapered end 225 faces the secondary pipe and the second tapered end 227 is opposite the first tapered end. Consequently, the seal width is reduced radially away from the primary pipe. The first tapered end of the seal is complementary to the tapered surface 249 on the locking nut post section.

A coupling inner member 272 is then slid over the primary pipe and is abutted against the seal. The inner surface 275 at the end 273 of the coupling inner member is stepped such that a portion of the coupling inner end covers the seal upper surface 229 and is mated to the seal second tapered end 227 when the coupling inner member is abutted against the seal.

The locking nut is threaded onto the threads on the outer surface of the coupling inner member squeezing the tapered end seal 224 against the coupling inner member and the primary pipe, forming a seal between the coupling inner member and the primary pipe. By using a seal having the tapered ends which are mated to portions of the locking nut and coupling inner member, the force applied to the seal by the locking nut and coupling inner member has a vertical component toward the primary pipe. This force compresses the seal against the primary pipe, forming a tighter seal.

The coupling outer member is fitted over the locking nut compressing the O-ring seal 294 and forming a seal between the coupling outer member and the locking nut. The closure member is then clamped, using preferably worm gear clamps 295, to the outer surface of the secondary pipe and to the outer surface of the locking nut. If another double containment pipe is connected to the other end of the coupling, the same procedure as described above is followed.

Bleed holes 297 are drilled along the length of the locking nut to allow any fluid accumulated in the annulus 211 between the primary and the secondary pipes to travel through to the annulus 287 between the coupling members.

Figure 4:
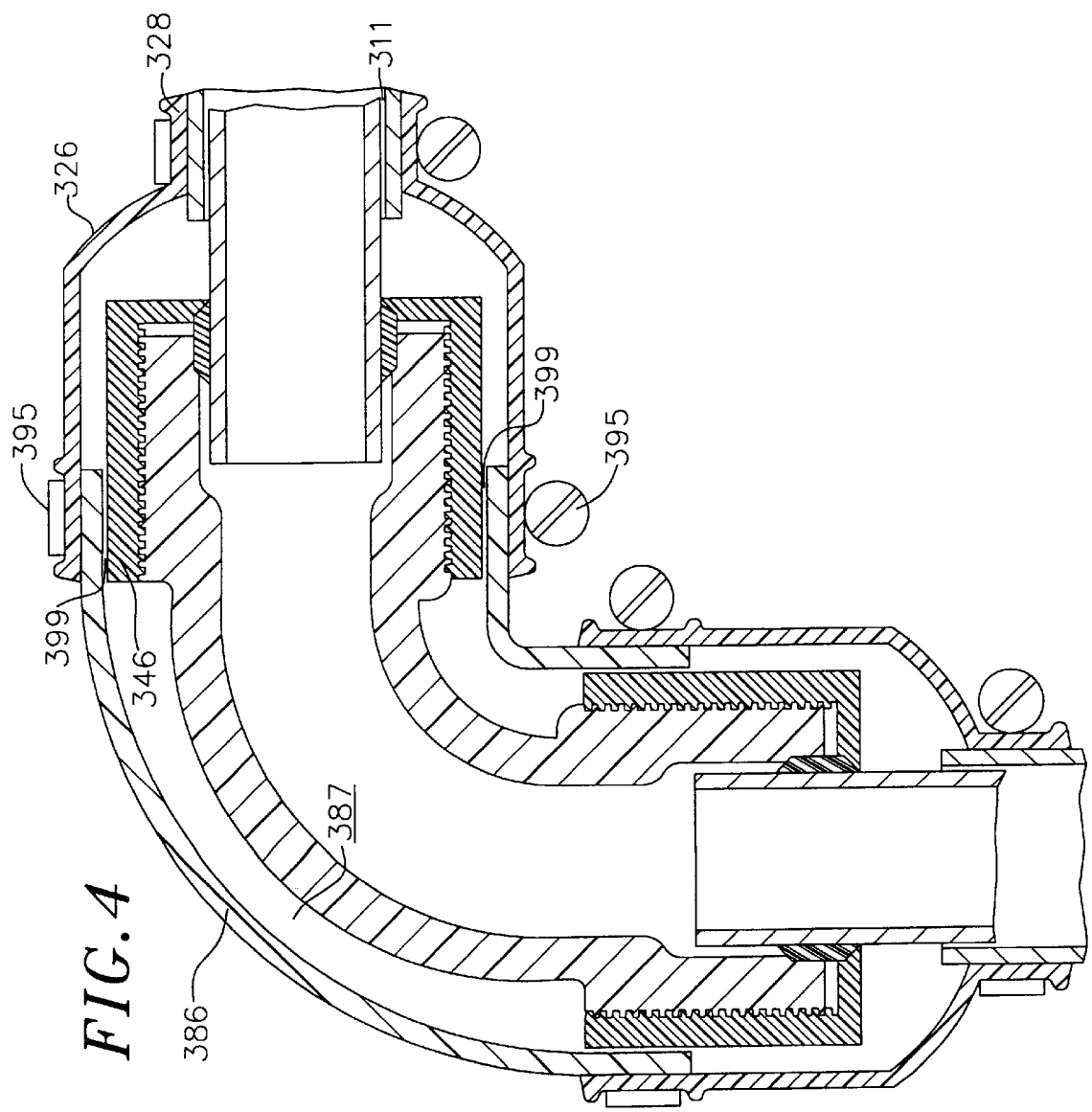
FIG. 4 is a cross sectional view of a further embodiment of the embodiment shown in FIG. 3.

In a further variation (FIG. 4) of the second embodiment, one end 328 of the closure member 326 is clamped using preferably a worm clamp 395 over the coupling outer member 386. With this embodiment, a locking nut can be used which does not have an annular groove and an O-ring fitted therein on its outer surface. The clamp provides enough pressure to form a seal between the closure member and coupling outer member. An annulus 399 is formed between the coupling outer member and the locking nut. Fluid accumulated in the pipe annulus 311 formed between the primary and secondary pipes can travel through the annulus 399 formed between the coupling outer member and the locking nut and through the coupling annulus 387.

With all of the embodiments, the primary pipes can be easily inspected for leakage by sliding the closure member away from the secondary pipe or the coupling outer member and checking for fluids.

When the double containment pipes are used to transport gasohol, all wetted accessories with the exception of the seals should preferably be made from reinforced epoxy thermoset materials. The accessories not normally wetted may be made from thermoplastic materials.

Although this invention has been described in certain specific embodiments, many additional modifications and variations will be apparent to those skilled in the art. It is therefore, understood that within the scope the appended claims, this invention may be practiced otherwise than specifically described.

What is claimed is:

1. A double containment pipeline section joint comprising:

an outer tube over and coaxial with an inner tube and having an annulus between the tubes for passage of fluid;

an inner coupling member on an end of the inner tube;

an outer coupling member around the inner coupling member leaving an annulus therebetween;

a first elastomeric seal including a tapered portion, between the inner coupling member and the inner tube;

a nut threadedly engaging the inner coupling member for causing the compression of the elastomeric seal between the inner coupling member and the inner tube for forming a fluid tight seal; and means for providing a fluid tight closure between the outer tube and outer coupling member.

2. A double containment pipeline section joint comprising:

an outer tube over and coaxial with an inner tube and having an annulus between the tubes for passage of fluid;

an inner coupling member on an end of the inner tube;

an outer coupling member around the inner coupling member leaving an annulus therebetween;

a first elastomeric seal including a tapered portion between the inner coupling member and the inner tube;

a nut threadedly engaging the inner coupling member;

a second elastomeric seal including a tapered portion mated to the tapered portion of the first elastomeric seal, wherein the nut causes the first elastomeric seal to move over the second elastomeric seal compressing the two seals between the inner coupling member and the inner tube; and means for providing a fluid tight closure between the outer tube and outer coupling member.

3. A double containment pipeline section joint as recited in claim 2 further comprising a thrust ring fitted over the inner tube and coupled between the nut and the first elastomeric seal.

4. A double containment pipeline section joint as recited in claim 3 wherein the thrust ring is split and wherein it comprises a tapered outer surface mated to a tapered inner surface on the inner coupling member.

5. A double containment pipeline section joint as recited in claim 4 wherein the tapered surface of the thrust ring is tapered at the same angle as the tapered surface of the first elastomeric seal.

6. A double containment pipeline section joint as recited in claim 2 wherein the second seal is wedged against the first elastomeric seal.

7. A double containment pipeline section joint as recited in claim 6 wherein when the primary pipe is pressurized the two seals further wedge against each other.

8. A double containment pipeline section joint comprising:

a double containment pipeline section having a primary pipeline section within a secondary pipeline section;

an outer coupling member;

an inner coupling member within the outer coupling member, the inner coupling member encompassing a portion of the primary pipeline section;

a first inner seal fitted between an inner surface of the inner coupling member and an outer surface of the primary pipeline section for forming a fluid tight seal between inner coupling member and the primary pipeline section;

an inner locking nut coupled to the inner coupling member and to the first inner seal; and a closure member coupled to the outer coupling member and to the secondary pipeline section.

9. A joint as recited in claim 8 wherein the closure member is threaded to the outer coupling member and wherein upon threading of the closure member on the outer coupling member a first outer seal is compressed for forming a seal between the closure member and outer coupling member.

10. A joint as recited in claim 9 wherein the closure member comprises a tapered annular lip for compressing the first outer seal against the outer coupling member.

11. A joint as recited in claim 8 further comprising an outer locking nut fitted over the secondary pipeline section and coupled to the closure member.

12. A double containment pipeline section joint comprising:

a double containment pipeline section having a primary pipeline section within a secondary pipeline section;

an outer coupling member;

an inner coupling member within the outer coupling member, the inner coupling member encompassing a portion of the primary pipeline section;

a first inner seal fitted between an inner surface of the inner coupling member and an outer surface of the primary pipeline section;

an inner locking nut coupled to the inner coupling member and to the first inner seal;

a closure member coupled to the outer coupling member and to the secondary pipeline section;

an outer locking nut fitted over the secondary pipeline section and coupled to the closure member; and a second outer seal fitted over the secondary pipeline section and compressed between the outer locking nut, the closure member and the secondary pipeline section, forming a seal therebetween.

13. A double containment pipeline section joint comprising:

a double containment pipeline section having a primary pipeline section within a secondary pipeline section;

an outer coupling member;

an inner coupling member within the outer coupling member, the inner coupling member encompassing a portion of the primary pipeline section;

a first inner seal fitted between an inner surface of the inner coupling member and an outer surface of the primary pipeline section;

a second inner seal wherein the first inner seal has a tapered inner surface and the second inner seal has a tapered outer surface and wherein the first inner seal inner surface is fitted over the second inner seal outer surface wherein both seals are compressed between the inner surface of the inner coupling member and the outer surface of the primary pipeline section;

an inner locking nut coupled to the inner coupling member and to the first inner seal; and a closure member coupled to the outer coupling member and to the secondary pipeline section.

14. A joint as recited in claim 13 wherein the inner locking nut is coupled to the first inner seal for pushing the first inner seal over the second inner seal.

15. A joint as recited in claim 14 wherein the inner locking nut is coupled to the first inner seal by a split thrust ring fitted over the primary pipeline section.

16. A joint as recited in claim 15 wherein the split thrust ring comprises a tapered outer surface and wherein the inner coupling member has a tapered inner surface mated to the thrust ring tapered outer surface, wherein as the inner locking nut is threaded on the inner coupling member it pushes the thrust ring, causing the thrust ring outer tapered surface to slide on the inner coupling member tapered inner surface and constrict toward the primary pipeline section.

17. A joint as recited in claim 16 wherein the thrust ring tapered outer surface is tapered at the same angle as the inner seal tapered surfaces.

18. A joint as recited in claim 15 wherein the thrust ring has a tapered inner surface for sliding over the second inner seal as the thrust ring pushes the first inner seal over the second inner seal.

19. A joint as recited in claim 13 wherein the second inner seal wedges against the first inner seal to prevent disengagement of the primary pipe from the inner coupling member.

20. A joint as recited in claim 13 wherein the second inner seal is friction locked against the primary pipe outer surface.

21. A joint as recited in claim 13 wherein the compressed inner seals form a joint between the primary pipe and the inner coupling member capable of withstanding pressures of 500 psi.

22. A double containment pipeline section joint comprising:

a double containment pipeline section having a primary pipeline section within a secondary pipeline section;

an outer coupling member;

an inner coupling member within the outer coupling member, the inner coupling member encompassing a portion of the primary pipeline section;

a first inner seal fitted between an inner surface of the inner coupling member and an outer surface of the primary pipeline section;

an inner locking nut coupled to the inner coupling member and to the first inner seal wherein the inner locking nut comprises an annular lip extending from an outer surface of the inner locking nut; and a closure member coupled to the outer coupling member and to the secondary pipeline section.

23. A joint as recited in claim 22 wherein the inner locking nut annular lip is positioned between the inner coupling and outer coupling members and wherein the radial distance between the outer coupling member and the annular lip of the inner locking nut is small enough to be bridged by soapy water.

24. A method for joining a double containment pipeline section end having a primary pipeline section within a secondary pipeline section and an annulus therebetween to a coupling having inner and outer members, comprising the steps of:

sliding the primary pipe within the inner member;

threading a locking nut onto the inner member compressing a first elastomeric seal between the primary pipe and the inner member;

coupling a first end of a closure member to the outer member; and coupling the second end of a closure member to the secondary pipe.

25. A method as recited in claim 24 wherein the step of threading comprises the step of pushing a split thrust ring fitted over the primary pipe for compressing the first elastomeric seal over a second elastomeric seal.

26. A method as recited in claim 24 wherein the step of pushing further comprises the step of constricting the split thrust ring over the primary pipe.

27. A method as recited in claim 26 wherein the step of constricting comprises the step of constricting an inner seal at the same rate as the constricting of the split thrust ring.

28. A method as recited in claim 24 further comprising the steps of:

bridging the annulus between the primary and secondary pipes at an end of the double containment pipeline section with soapy water;

pressurizing the primary pipe; and determining if bubbles are formed on the soapy water bridging the annulus, wherein bubbles are indicative of leakage of the primary pipe.

29. A double containment pipeline section joint comprising:

a double containment pipeline section having a primary pipeline section within a secondary pipeline section wherein a first end of the primary pipeline section extends beyond a first end of the secondary pipeline section;

an inner seal fitted over the primary pipeline section first end, the seal having a first end facing the secondary pipeline section and an opposite second end;

a coupling inner member encompassing a portion of the primary pipeline section, and having an end abutting against the seal second end;

a locking nut coupled to the coupling inner member and to the first end of the seal;

a coupling outer member fitted over the coupling inner member and over a portion of the locking nut; and a closure member having first and second ends, the first end coupled to an outer surface of the secondary pipeline section and the second end coupled to the coupling outer member.

30. A joint as recited in claim 29 wherein the closure member second end is clamped to an outer surface of the locking nut.

31. A joint as recited in claim 29 wherein an annulus is formed between the coupling outer member and the locking nut and wherein the closure member second end is clamped over the coupling outer member.

32. A joint as recited in claim 29 further comprising a second seal compressed between the locking nut and the coupling outer member.

33. A joint as recited in claim 29 wherein the locking nut comprises a bleed passage spanning the length of the nut.

34. A method for joining a double containment pipeline section to a coupling, the double containment pipeline section having a primary pipeline section within a secondary pipeline section wherein a first end of the primary pipeline section extends beyond a first end of the secondary pipeline section, and the coupling having an inner and an outer member, the method of comprising the steps of:

placing a closure member over a first end of the secondary pipeline section;

placing a locking nut over the first end of the primary pipeline section;

fitting a seal over the first end of the primary pipeline section, the seal having a first end facing the secondary pipeline section and a second end opposite the first end;

placing a coupling inner member over the first end of the primary pipeline section and abutting the second end of the seal;

placing a coupling outer member over the coupling inner member;

threading the locking nut on the outer surface of the coupling inner member causing a portion of the locking nut to contact the seal first end compressing the seal against the coupling inner member and the primary pipeline section creating a seal between the coupling inner member and the primary pipeline section; and coupling a first end of the closure member to the secondary pipeline section; and coupling a second end of the closure member to the locking nut.

35. A method as recited in claim 34 wherein the step of threading the locking nut further comprises the step of forming a seal between the locking nut and an inner surface of the coupling outer member.

36. A method as recited in claim 34 wherein the step of coupling a second end of the closure member comprises the step of clamping the second end of the closure member to the outer surface of the locking nut.

37. A method as recited in claim 34 wherein the step of coupling a second end of the closure member comprises the steps of:

placing the coupling outer member over a portion of the locking nut forming an annulus therebetween; and clamping the second end of the closure member over the coupling outer member.

* * * * *

UNITED STATES PATENT AND TRADEMARK OFFICE
CERTIFICATE OF CORRECTION

PATENT NO. : 5,934,712
DATED : August 10, 1999
INVENTOR(S) : Ralph S. Friedrich; Paul Kubat It is certified that error appears in the above-identified patent and that said Letters Patent is hereby corrected as shown below:

On the title page, item [75] Inventors, the Inventors should read:
-- Ralph S. Friedrich, Hermosa Beach,
Paul Kubat, La Mirada, both of Calif. --.

Item [56] References Cited, U.S. Patent Documents, replace
"3,103,737" with -- 3,103,373 --.

Signed and Sealed this

Seventeenth Day of April, 2001

Attest:

NICHOLAS P. GODICI

*Attesting Officer*   *Acting Director of the United States Patent and Trademark Office*